(12) United States Patent
Ramasubramanian et al.

(10) Patent No.: US 8,119,269 B2
(45) Date of Patent: Feb. 21, 2012

(54) SECONDARY BATTERY WITH AUXILIARY ELECTRODE

(75) Inventors: Murali Ramasubramanian, Fremont, CA (US); Robert M. Spotnitz, Pleasanton, CA (US)

(73) Assignee: Enovix Corporation, Fremont, CA (US)

( * ) Notice: Subject to any disclaimer, the term of this patent is extended or adjusted under 35 U.S.C. 154(b) by 839 days.

(21) Appl. No.: 12/119,369

(22) Filed: May 12, 2008

(65) Prior Publication Data

US 2009/0208834 A1  Aug. 20, 2009

Related U.S. Application Data

(60) Provisional application No. 60/928,519, filed on May 10, 2007.

(51) Int. Cl.
*H01M 2/00* (2006.01)
*H01M 10/44* (2006.01)
*H01M 6/42* (2006.01)
*H01M 10/26* (2006.01)
*H01M 4/13* (2006.01)

(52) U.S. Cl. ........... 429/61; 429/50; 429/149; 429/206; 429/209; 429/231.5; 429/231.8; 429/231.9

(58) Field of Classification Search .................. 429/149, 429/206, 231.5, 232.9, 231.9, 50, 61, 209, 429/231.8
See application file for complete search history.

(56) References Cited

U.S. PATENT DOCUMENTS

| | | | |
|---|---|---|---|
| 5,304,433 A | | 4/1994 | Cherng |
| 6,090,505 A | | 7/2000 | Shimamura et al. |
| 6,447,958 B1 | * | 9/2002 | Shinohara et al. ............ 429/248 |
| 7,373,264 B2 | | 5/2008 | Verbrugge et al. |
| 2006/0093871 A1 | | 5/2006 | Howard et al. |
| 2008/0003490 A1 | | 1/2008 | Christensen et al. |

FOREIGN PATENT DOCUMENTS

JP   2003323882 A   11/2003
KR   2003004444508 A   6/2003

OTHER PUBLICATIONS

Broussely, Michel et al., "Li-ion batteries and portable power source prospects for the next 5-10 years", Journal of Power Sources, 136, pp. 386-394 (2004).
Long, J.W. et al., "Three-Dimensional Battery Architectures", Chemical Reviews, vol. 104, No. 10, pp. 4463-4492 (2004).
Obrovac, M. N. et al., "Reversible Cycling of Crystalline Silicon Powder", Journal of The Electrochemical Society, vol. 154, No. 2, pp. A103-A108 (2007).
Waidmann, S. et al., "Tuning nickel silicide properties using a lamp based RTA, a heat conduction based RTA or a furnace anneal", Microelectronic Engineering 83, pp. 2282-2286 (2006).
International Search Report for PCT/US2009/043662, mailed Jul. 9, 2009.
West, K., et al., Modeling of Porous Insertion Electrodes with Liquid Electrolyte, J. Electrochem. Soc.; Jul. 1982, 1480.

* cited by examiner

*Primary Examiner* — Ula C. Ruddock
*Assistant Examiner* — Thomas H. Parsons
(74) *Attorney, Agent, or Firm* — Bryan Cave LLP

(57) ABSTRACT

The present invention includes three-dimensional secondary battery cells comprising an electrolyte, a cathode, an anode, and an auxiliary electrode. The cathode, the anode, and the auxiliary electrode have a surface in contact with the electrolyte. The anode and the cathode are electrolytically coupled. The auxiliary electrode is electrolytically coupled and electrically coupled to at least one of the anode or the cathode. Electrically coupled means directly or indirectly connected in series by wires, traces or other connecting elements. The average distance between the surface of the auxiliary electrode and the surface of the coupled cathode or the coupled anode is between about 1 micron and about 10,000 microns. The average distance means the average of the shortest path for ion transfer from every point on the coupled cathode or anode to the auxiliary electrode.

27 Claims, 7 Drawing Sheets

SECONDARY BATTERY WITH AUXILIARY ELECTRODE

The present application claims the benefit of U.S. Provisional Application 60/928,519, filed May 10, 2007, which is incorporated herein by reference in its entirety.

FIELD OF THE INVENTION

The present invention relates to secondary battery cells and secondary batteries well as methods for producing these devices and systems incorporating these cells and batteries.

BACKGROUND OF THE INVENTION

Secondary batteries are a type of rechargeable battery in which ions move between the anode and cathode through an electrolyte. Secondary batteries include lithium-ion, sodium-ion, potassium-ion batteries, and lithium batteries as well as other battery types. Secondary batteries are often made of many cells that are grouped together to form the battery. Each cell of a secondary battery contains an electrolyte, and at least one cathode, and at least one anode. When the cells are grouped together to form a battery, the cathodes and anodes of each cell can be electrically coupled to achieve the desired capacity of the battery.

In secondary battery cells, both the anode and cathode comprise materials into which a carrier ion inserts and extracts. The process of the carrier ion moving into the anode or cathode is referred to as insertion. The reverse process, in which the carrier ion moves out of the anode or cathode is referred to as extraction. During discharging of a cell, the carrier ion is extracted from the anode and inserted into the cathode. When charging the cell, the exact reverse process occurs: the carrier ion is extracted from the cathode and inserted into the anode.

Lithium-ion batteries are a popular type of secondary battery in which the carrier ions are lithium ions that move between the cathode and the anode thought the electrolyte. The benefits and the challenges of lithium-ion battery cells are exemplary of the benefits and challenges of other secondary battery cells; the following examples pertaining to lithium-ion battery cells are illustrative and are not limiting. In lithium-ion battery cells, the lithium ions move from the anode to the cathode during discharge and from the cathode to the anode when charging. Lithium-ion batteries are highly desirable energy sources due to their high energy density, high power, and long shelf life. Lithium-ion batteries are commonly used in consumer electronics and are currently one of the most popular types of battery for portable electronics because they have high energy-to-weight ratios, no memory effect, and a slow loss of charge when not in use. Lithium-ion batteries are growing in popularity for in a wide range of applications including automotive, military, and aerospace applications because of these advantages.

FIG. 1 is a cross section of a prior art lithium-ion battery cell. The battery cell 15 has a cathode current collector 10 on top of which a cathode 11 is assembled. The cathode 11 is covered by a separator 12 over which an assembly of the anode current collector 13 and the anode 14 is placed. The separator 12 is filled with an electrolyte that can transportions between the anode and the cathode. The current collectors 10, 13 are used to collect the electrical energy generated by the battery cell 15 and connect it to other cells and to an outside device so that the outside device can be electrically powered and to carry electrical energy to the battery during recharging.

For most existing secondary batteries, after the initial charge there is a significant drop in total overall capacity. For instance, in a standard lithium-ion battery, the loss in total charge capacity after the first charge-discharge cycle is about 5-15%. The term "about" as used herein means within plus or minus 15% of the specified value. Moreover, a portion of the capacity of most existing secondary batteries is lost with each subsequent charge-discharge cycle. For instance, in a standard lithium-ion battery, the loss in total charge capacity after each subsequent charge-discharge cycle is about 0.1%.

Three dimensional energy battery cells and batteries can produce higher energy storage and retrieval per unit geometrical area than conventional two dimensional (or planar) devices. Three-dimensional secondary batteries also have a decided advantage in providing a higher rate of energy retrieval than planar counterparts for a specific amount of energy stored, by means such as minimizing or reducing transport distances for electron and ion transfer between an anode and a cathode. These devices can be more suitable for miniaturization and for applications where a geometrical area available for a device is limited and where energy density requirement is higher than what can be achieved with a planar device. A three-dimensional secondary battery cell can be one in which any one (or more) of an anode, a cathode, and a separator are non-planar in nature, and an actual surface area for such non-planar component is greater than twice its geometrical surface area. In some instances, a separation between two height planes on a third dimension should be at least greater than a periodicity in an x-y plane divided by a square root of two. For example, for a 1 cm×1 cm sample, a geometrical surface area is 1 cm$^2$. However, if the sample is not flat but has a groove in a depth dimension whose depth is greater than one divided by the square root of two, or 0.707 cm, then its actual surface area would be greater than 2 cm$^2$.

SUMMARY OF THE INVENTION

The present invention includes three-dimensional secondary battery cells, batteries, and systems of using and methods of making the same. A secondary battery cell of the present invention comprises an electrolyte, a cathode, an anode, and an auxiliary electrode. The cathode, the anode, and the auxiliary electrode each have a surface in contact with the electrolyte. The anode and the cathode are electrolytically coupled, meaning that the carrier ions of the battery can transfer through the electrolyte from the anode to the cathode and from the cathode to the anode. The auxiliary electrode is electrolytically coupled and electrically coupled to at least one of the anode or the cathode. Electrically coupled means directly or indirectly connected in series by wires, traces or other connecting elements. The average distance between the surface of the auxiliary electrode and the surface of the coupled cathode or the coupled anode is between about 1 micron and about 10,000 microns. The average distance means the average of the shortest path for ion transfer from every point on the coupled cathode or anode to the auxiliary electrode.

DETAILED DESCRIPTION OF THE INVENTION

The inventors of the present invention have discovered that by using the devices and methods of the present invention, secondary battery cells and secondary batteries can be manufactured so as to mitigate the problems associated with the loss of capacity after the initial and subsequent charge/discharge cycles and to allow for increased control during the cell or battery's charge/discharge cycles.

The auxiliary electrode of the present invention can be used for increasing the capacity of the energy storage device, improving the control of the rate of charge and/or discharge of the device, and/or monitoring the performance of the device over time. The auxiliary electrode of the present invention differs from conventional reference electrodes in that it is proximate to substantially all parts of the cathode and/or anode and capable of passing significant current. Existing auxiliary electrodes are used as reference electrodes which are not as effective because of the significant resistance across a single electrode in a conventional battery. In the present invention, the auxiliary electrode is proximate to the anodes and/or cathodes of a secondary cell allowing carrier ion access to substantially all parts of the cathodes and/or anodes. This allows for a capability of passing significant current as well as measuring potential more accurately.

The present invention includes a three-dimensional secondary battery cell comprising an electrolyte, a cathode, an anode, and an auxiliary electrode. The cathode, the anode, and the auxiliary electrode each have a surface in contact with the electrolyte. The anode and the cathode are electrolytically coupled, meaning that the carrier ions of the battery can transfer through the electrolyte from the anode to the cathode and from the cathode to the anode. The auxiliary electrode is electrolytically coupled and electrically coupled to at least one of the anode or the cathode. Electrically coupled means directly or indirectly connected in series by wires, traces or other connecting elements. The average distance between the surface of the auxiliary electrode and the surface of the coupled cathode or the coupled anode is between about 1 micron and about 10,000 microns. The average distance means the average of the shortest path for ion transfer from every point on the coupled cathode or anode surface to the auxiliary electrode surface.

In another embodiment of the secondary battery cell of the present invention, the average distance between the surface of the auxiliary electrode and the surface of the coupled cathode or the coupled anode is between about 5 microns and about 1000 microns. In another embodiment, the average distance between the surface of the auxiliary electrode and the surface of the coupled cathode or the coupled anode is between about 10 microns and about 500 microns.

Figure 1:
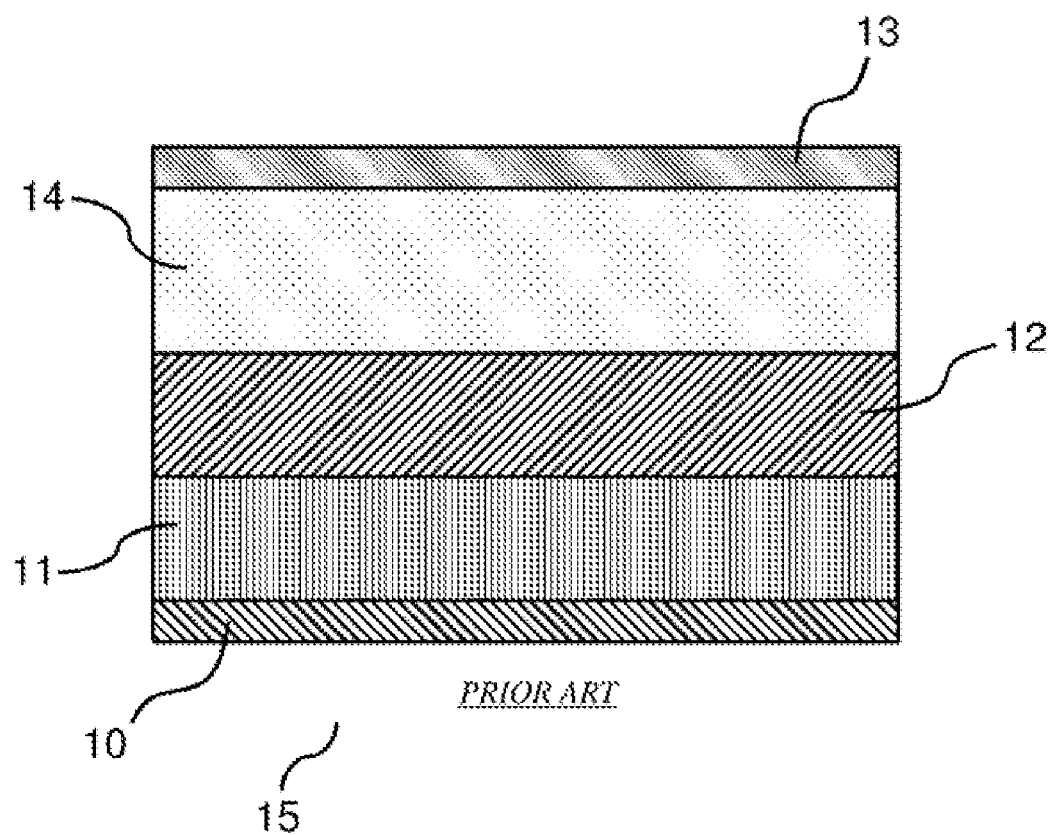
FIG. 1 is a cross section of a prior art lithium-ion battery.
Figure 2:
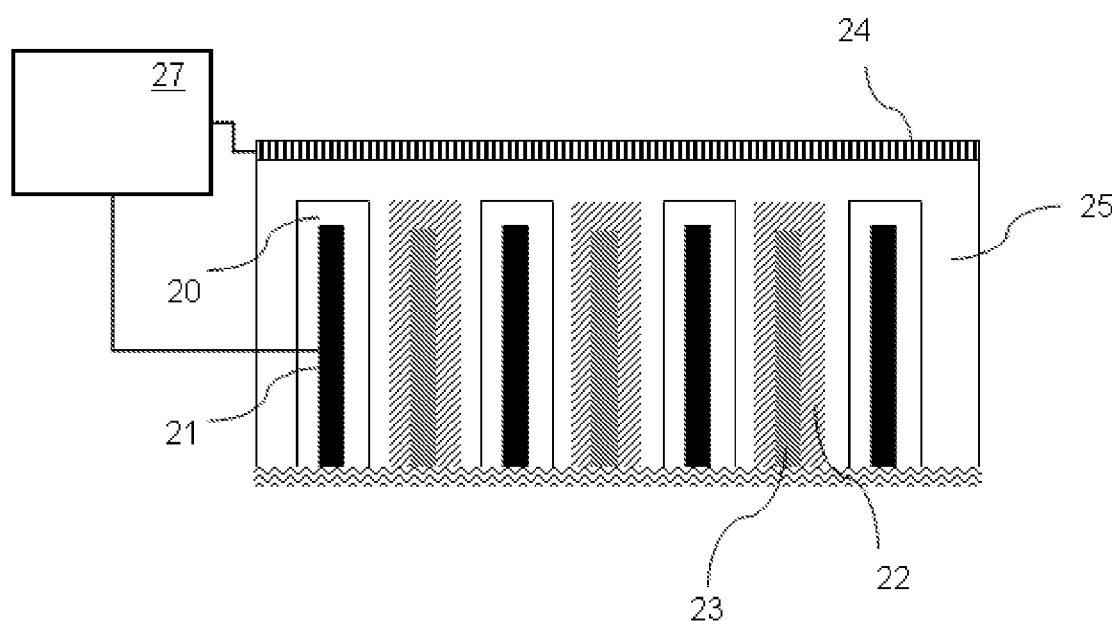
FIG. 2 is an illustration of a secondary battery cell of the present invention.

FIG. 2 is an illustration of an exemplary embodiment of a secondary battery cell of the present invention. The cell contains at least one cathode 20, at least one anode 22, and an auxiliary electrode 24. Even though the auxiliary electrode 24 is shown as one piece, it can comprise a plurality of electrode elements or portions. The cathode 20 can contain a cathode current collector 21. The anode 22 can contain an anode current collector 23. If the cell contains multiple cathodes 20, the cathodes 20 can be electrically coupled to each other. If the cell contains multiple anodes 22, the anodes 22 can be electrically coupled to each other. The cell contains a separator 25 between the cathode 20 and anode 22. The cell also contains a separator between the auxiliary electrode and the cathode 20 or anode 22. The separator between the auxiliary electrode 24 and the cathode 20 or anode 22 can be the same material as the separator 25 or it can be a different material. The separator 25 contains an electrolyte that is capable of transporting the carrier ions of the cell. In the embodiment of FIG. 2, the auxiliary electrode 24 is electrically coupled to the cathode 20. The electrical coupling between the auxiliary electrode 24 and the cathode 20 may contain components 27 to sense or control current or voltage as well as to store information about current or voltage.

In another embodiment, the auxiliary electrode is electrically coupled to the cathode and the cathode comprises a cathode material, wherein the cathode material is atmospherically unstable in its carrier-ion-inserted form. Materials that are atmospherically unstable in their carrier-ion-inserted form are materials in which the material and/or the inserted carrier ions react with components in air. For example, lithium inserted in titanium sulfide reacts with oxygen and water vapor in the air. Examples of cathode materials that can be unstable in their carrier-ion-inserted form include titanium sulfides (e.g., titanium disulfide, $TiS_2$), molybdenum sulfides (e.g., molybdenum disulfide, $MoS_2$) and vanadium oxides (e.g., $V_2O_5$). In another embodiment, the auxiliary electrode functions as an auxiliary cathode. A cathode in combination with an auxiliary cathode can achieve better performance than the cathode alone. An example of a cathode and auxiliary cathode with improved performance is $LiMn_2O_4$ and $LiNi_{0.8}Co_{0.15}Al_{0.05}O_2$ being electrically coupled together as cathodes. By electrically coupling these two cathodes together, better cycle life and performance of the battery can be achieved.

In another embodiment of the secondary battery cell of the present invention, the auxiliary electrode can be electrically coupled to the anode. In an embodiment in which the auxiliary electrode is electrically coupled to the anode, the auxiliary electrode can function as an auxiliary anode. An anode in combination with an auxiliary anode can achieve better performance than the anode alone. Alternatively, the auxiliary electrode can be electrically coupled to both the cathode and the anode. In another embodiment, the anode comprises an anode material, wherein the anode material is atmospherically unstable in its carrier-ion-inserted form. Examples of anode materials that are atmospherically unstable in their carrier-ion-inserted form include silicon, germanium, carbon, tin, aluminum, mixtures of transition metals and silicon, and lithium titanate.

In another embodiment, both the anode and the cathode comprise materials that are atmospherically unstable in their carrier-ion-inserted form. Battery cells in which both the anode and the cathode comprise materials that are atmospherically unstable in their carrier-ion-inserted form have heretofore been prohibitively dangerous and/or expensive to manufacture since the carrier ion of the cell could not be introduced into the cathode or the anode prior to assembly of the cell. For example, titanium sulfide/graphite cells are not practical as the cathode/anode respectively, of conventional lithium-ion cells, because neither titanium sulfide nor graphite can be used in a lithiated form to make a cell. However, the use of an auxiliary lithium electrode makes it possible to use cathode materials like titanium sulfide, molybdenum sulfide, and vanadium oxide with anodes like silicon, germanium, carbon, tin, aluminum, mixtures of transition metals and silicon, and lithium titanate. After assembly and sealing the cell with all three electrodes the auxiliary electrode can be used to introduce carrier ions, like lithium-ions, to the anode and/or cathode.

The batteries and battery cells of the present invention can comprise aqueous or nonaqueous electrolytes.

Figure 3:
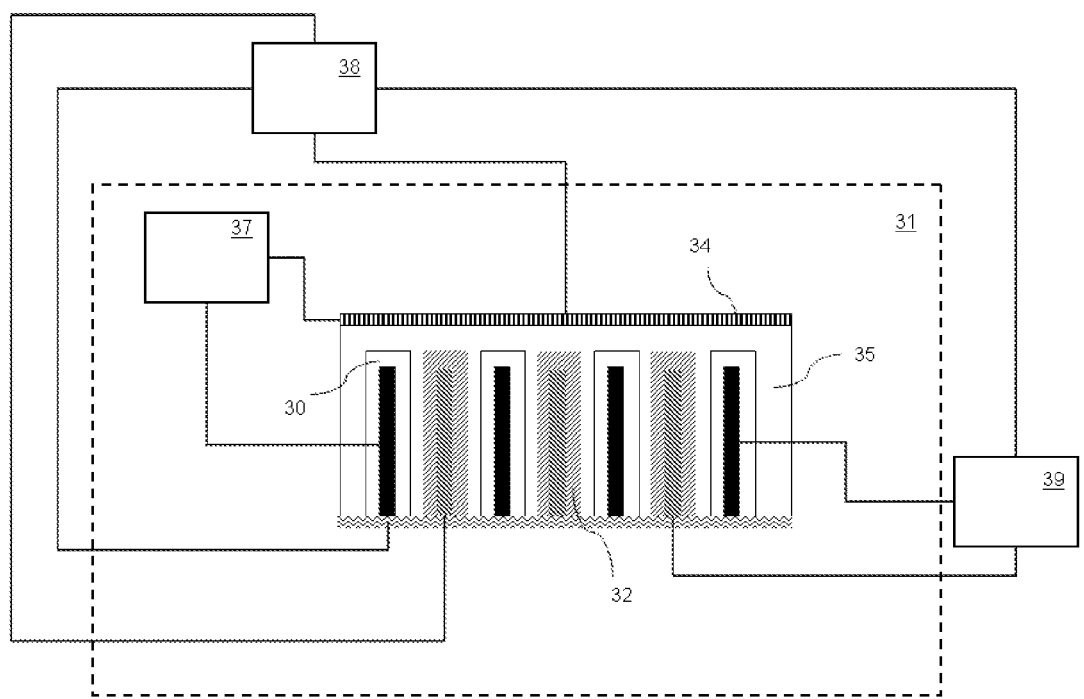
FIG. 3 is an illustration of a system of the present invention including a secondary battery cell of the present invention.

As shown in FIG. 3, an embodiment of the present invention relates to a system comprising a secondary battery cell 31 with an auxiliary electrode oriented as previously described, a sensor 38, and a controller 39. The sensor 38 senses the voltage of at least one of the cathode 30 or anode 32 relative to the auxiliary electrode 34. The sensor 38 is electrically coupled to the cathode 30 or the anode 32 at which the voltage is sensed and to the auxiliary electrode 34. In FIG. 3, the sensor 38 is shown as electrically coupled to both the cathode 30 and the anode 32. However, the present invention also included embodiments in which the sensor 38 is coupled to only the cathode 30 or the anode 32. The controller 39 is electrically coupled to the sensor 38 and the controller 39 can control the voltage or the current in a load/charge circuit between the cathode 30 and anode 32 according to the sensed voltage. A load/charge circuit between the cathode 30 and the anode 32 is a circuit that contains the load driven by the current produced by the battery cell when the cell is discharged or a circuit through which electrical energy is used to recharge the cell. The cathode 30 and the anode 32 are electrolytically coupled through the electrolyte in the separator 35. The auxiliary electrode 34 is electrolytically coupled to at least one of the cathode 30 or anode 32 through the electrolyte in the separator 35.

In FIG. 3, the auxiliary electrode 34 is electrically coupled to the cathode 30. However, the present invention includes embodiments in which the auxiliary electrode 34 is electrically coupled to the anode 32 as well as embodiments in which the auxiliary electrode 34 is electrically coupled to both the cathode 30 and the anode 32. The electrical coupling between the auxiliary electrode 34 and the cathode 30 or anode 32 may contain components 37 to sense or control current or voltage as well as to store information about current or voltage. The components 37 in the electrical coupling between the auxiliary electrode 34 and the cathode 32 or anode 30 can be electrically coupled to the sensor 38 and to the controller 39.

Figure 4:
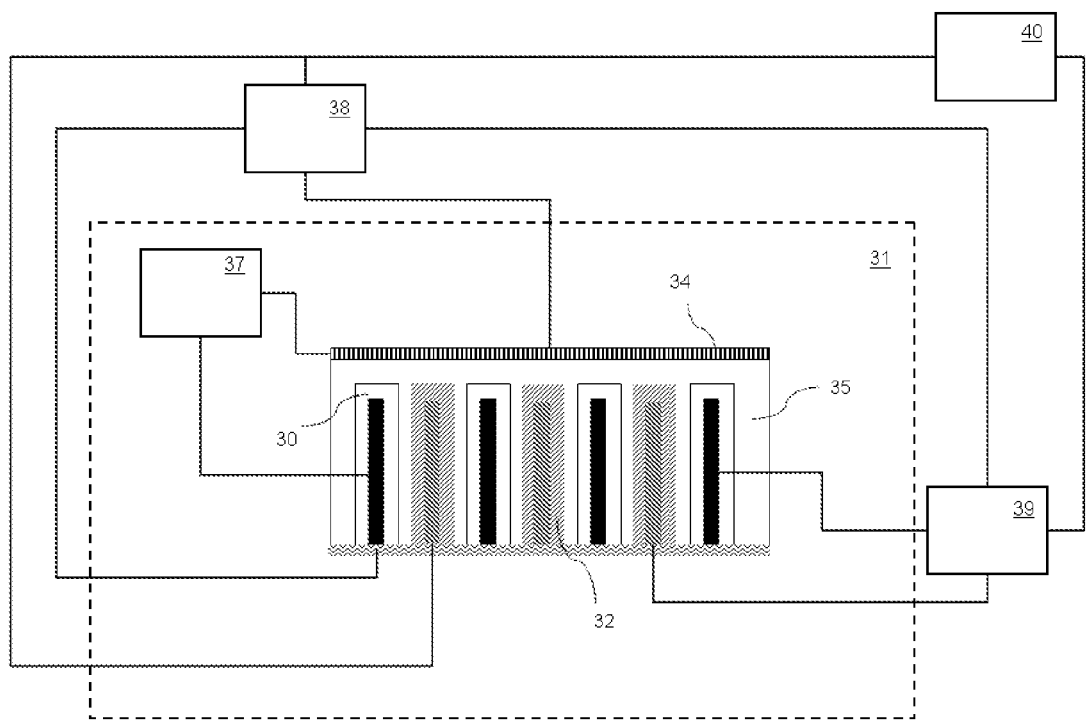
FIG. 4 is an illustration of a system of the present invention including a secondary battery cell of the present invention.

As shown in FIG. 4, an embodiment of the system of the present invention can comprise a memory unit 40 coupled to the sensor, wherein the memory unit 40 stores data about the sensed voltage. The memory unit 40 can be coupled to the controller 39 and the controller 39 can control the voltage or the current in the load/charge circuit according to the data stored in the memory unit 40 as well as according to the voltage sensed by the sensor 38. Using a memory unit 40, the auxiliary electrode of the present invention can be used to monitor the charge and/or discharge process of a secondary battery cell by allowing for recognition of storage device failure modes, recognition in changes of battery capacity and/or life, programmable notifications of battery end of life, and so forth.

The auxiliary electrode 34 of the present invention can be used to control the rate of charge and/or discharge of the battery cell. This can be achieved by manufacturing the auxiliary electrode out of a reference material that can be used to tune and/or stop the rate of charge and/or discharge. For most existing rechargeable energy storage devices, discharge is allowed to continue until the potential difference between anode and cathode reaches a lower limit based on battery chemistry. However, in some cases it may be advantageous to stop the discharge at an anode or cathode potential relative to a constant reference instead of relative to each other. For instance, in the case of a silicon anode as part of a lithium-ion battery, the life of a silicon anode is reduced and the silicon anode is not stable if completely discharged. Ideally, discharge should stop when the silicon anode reaches a voltage of 0.9 V relative to lithium. In a conventional lithium-ion battery, controlling the voltage of the anode is done indirectly through the voltage differential between the anode and the cathode in the cell, the cell voltage. However, the use of an auxiliary lithium electrode electrically and electrolytically coupled to at least one of the cathode or anode allows direct monitoring of the anode and cathode and so the potential of the anode could be directly controlled and maintained above 0.9 V relative the auxiliary electrode. Other potential auxiliary electrode materials that could be used are lithium alloys, carbonaceous materials, lithium metal oxides and lithium metal phosphates.

In another embodiment of the invention the auxiliary electrode 34 can act as a means for rapid recharging of the secondary battery cell. For most existing secondary battery cells, the rate of charge of the device is set by charging at a constant current—one that is relatively low to ensure that the overpotential to the charge carrier back from cathode to anode is not so high that device degradation occurs-either at the anode or cathode or both. For example, in a standard lithium-ion battery, if a driving voltage of 4.3V at the cathode relative to a lithium reference is exceeded then undesirable side reactions are likely to occur on the cathode. Similarly, the voltage of the anode must remain above a certain value. In a standard lithium-ion battery cell, the anode must remain above 0V relative to lithium or lithium deposition on the anode will occur. To ensure that these negative effects at the cathode and anode do not happen, existing secondary battery cells charge with a battery voltage cutoff of 4.2 V so that the cathode voltage threshold limit of 4.3V cannot be exceeded and the anode threshold voltage of 0.1 V cannot be passed. With an auxiliary electrode, however, the electrode can actually be driven at a chosen voltage to maximize the current delivery and reducing charge time. Preferably, the increased current used to charge a cell of the present invention should correspond to at least a C/100 rate relative to the capacity ("C") of the electrode that is being charged. It would however, more preferably correspond to at least a C/50 charge rate and, most preferably at least a C/20 charge rate.

FIG. 3 also shows how the auxiliary electrode 34 can act as a reference electrode to shut off discharge when the voltage of the anode 32 and/or cathode 30 exceeds a specified limit versus the auxiliary electrode 34. One embodiment of the invention would implement this by sensing the voltage at the cathode 30 or anode 32 relative to the auxiliary electrode 34 with a sensor 38. The controller 39 would isolate the cell from the circuit it was powering when the predefined voltage limit is exceeded.

The controller 39 of FIG. 4 can cause the auxiliary electrode 34 to replenish at least one of the cathode or anode according to the voltage sensed by the sensor 38. Alternatively, the controller 34 can cause the auxiliary electrode 34 to replenish at least one of the cathode or anode according to the data stored in the memory unit 40 or according to both the voltage sensed by the sensor 38 and data stored in the memory unit 40.

To replenish the cathode 30 or anode 32, a current can be applied between the auxiliary electrode 34 and the cathode 30 or anode 32. For example, for a lithium-ion secondary battery cell, using a lithium foil as the auxiliary electrode, applying a current between the lithium foil and the anode can replenish the capacity lost in the first cycle and/or subsequent cycles of the cell.

In an embodiment of the secondary battery cell of the present invention, the cell has been cycled and the cathode or the anode has been replenished by the auxiliary electrode.

The present invention includes methods of preparing a replenished secondary battery cell comprising: obtaining the secondary battery cell as described herein; cycling the anode and cathode of the cell; and replenishing at least one of the coupled cathode or anode with carrier ions from the auxiliary electrode. After replenishment, the auxiliary electrode can be removed from the secondary battery cell. The auxiliary electrode can be removed to lower the weight or volume of the cell or to improve the reliability or safety of the cell or battery in which the cell is integrated.

Replenishment of the cathode or anode and removal of the auxiliary electrode prior to final packing of a secondary battery cell can improve the energy density of the battery cell. After the first charge and/or discharge cycle the lost energy capacity can be replenished by way of the auxiliary electrode material diffusing into the anode and/or cathode (a battery cell cycle is a charge or discharge of the battery cell). Diffusion of the auxiliary electrode material can be accomplished by applying a voltage across the auxiliary electrode and the cathode and/or anode separately to drive material transfer between auxiliary electrode and anode and/or cathode, or by other transport phenomenon that will drive auxiliary electrode material transfer to the anode and/or cathode.

If the auxiliary electrode is not removed from the cell, the replenishment can be done after final packaging and the auxiliary electrode will be left in the final battery. If the auxiliary electrode is left in the final packaged battery cell and corresponding battery, then the battery cell can perform a capacity replenishment to replenish the capacity fade that occurs over the course of cycling the battery cell.

The auxiliary electrode of the present invention can be formed by placing an electrode made from the desired material in an inactive area of the battery cell but still electrolytically coupled to the anode and/or the cathode through separator. Alternatively, the auxiliary electrode can be formed by depositing the desired auxiliary electrode material, using techniques such as electrochemical deposition, electroless deposition, electrophoretic deposition, vacuum assisted filling, stencil assisted filling, and so forth.

The secondary battery cells and systems of the present invention may be incorporated into secondary batteries. A secondary battery can be made according to the methods of the present invention or with the cells and systems of the present invention as known in the art. See, e.g., Long et. al., *Three-Dimensional Battery Architectures*, Chemical Reviews, 2004, 104, 4463-4492; Wang and Cao, Electrochimica Acta, 51, 2006, 4865-4872; and Nishizawa et al., Journal of the Electrochemical Society, 1923-1927, 1997; Shemble et. al., $5^{th}$ Advanced Batteries and Accumulators, ABA-2004.

A secondary battery of the present invention can comprise a plurality of the secondary battery cells as described herein, wherein the cathodes of the plurality of cells are electrically coupled, the anodes of the plurality of cells are electrically coupled, and the auxiliary electrodes of the plurality of cells are electrically coupled.

The following examples further illustrate the present invention. These examples are intended merely to be illustrative of the present invention and are not to be construed as being limiting.

EXAMPLES

Example 1

Figure 5:
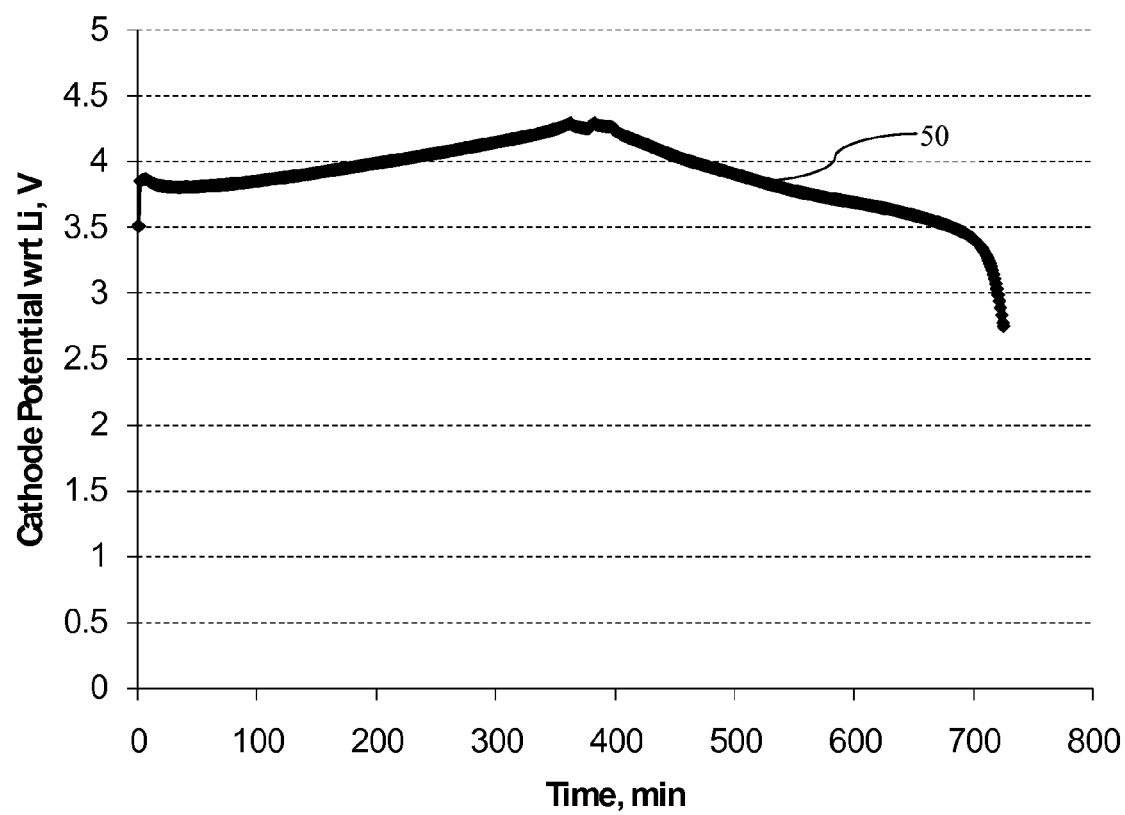
FIG. 5 is a plot of cathode potential relative to a lithium auxiliary electrode versus time from an example of the present invention.
Figure 6:
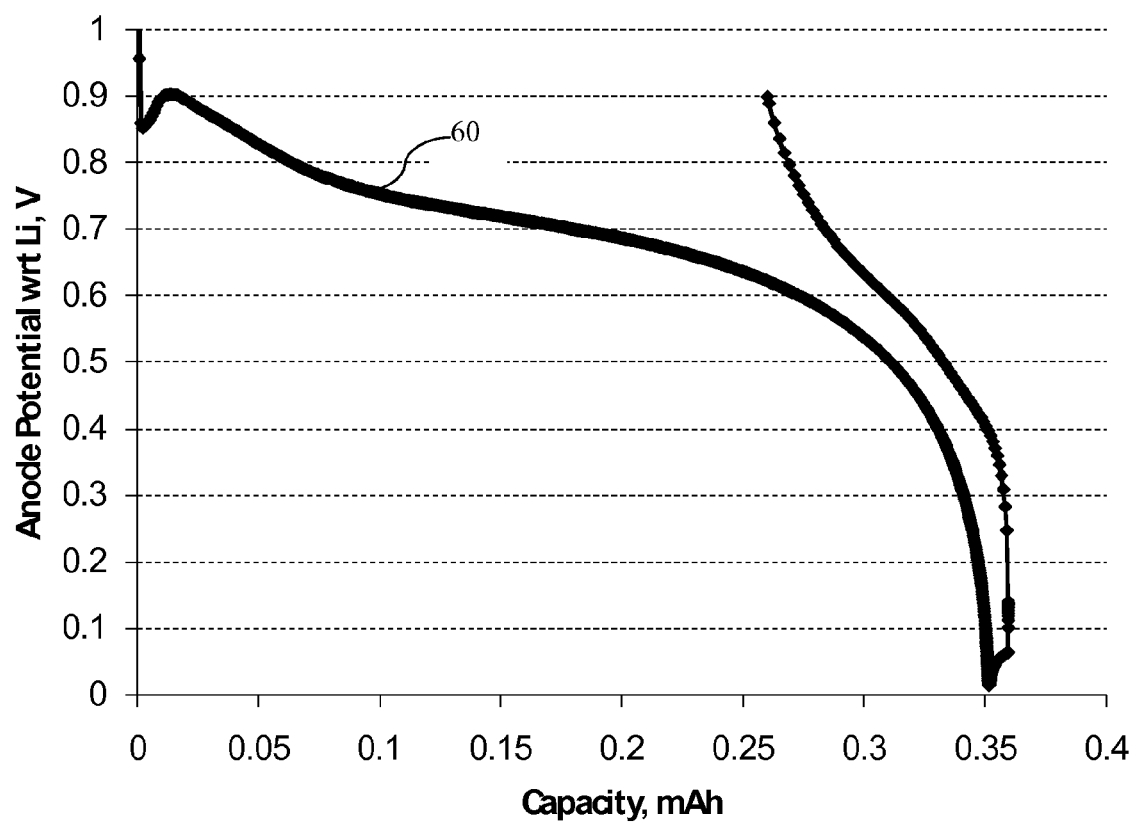
FIG. 6 is a plot of anode potential relative to a lithium auxiliary electrode versus time from an example of the present invention.
Figure 7:
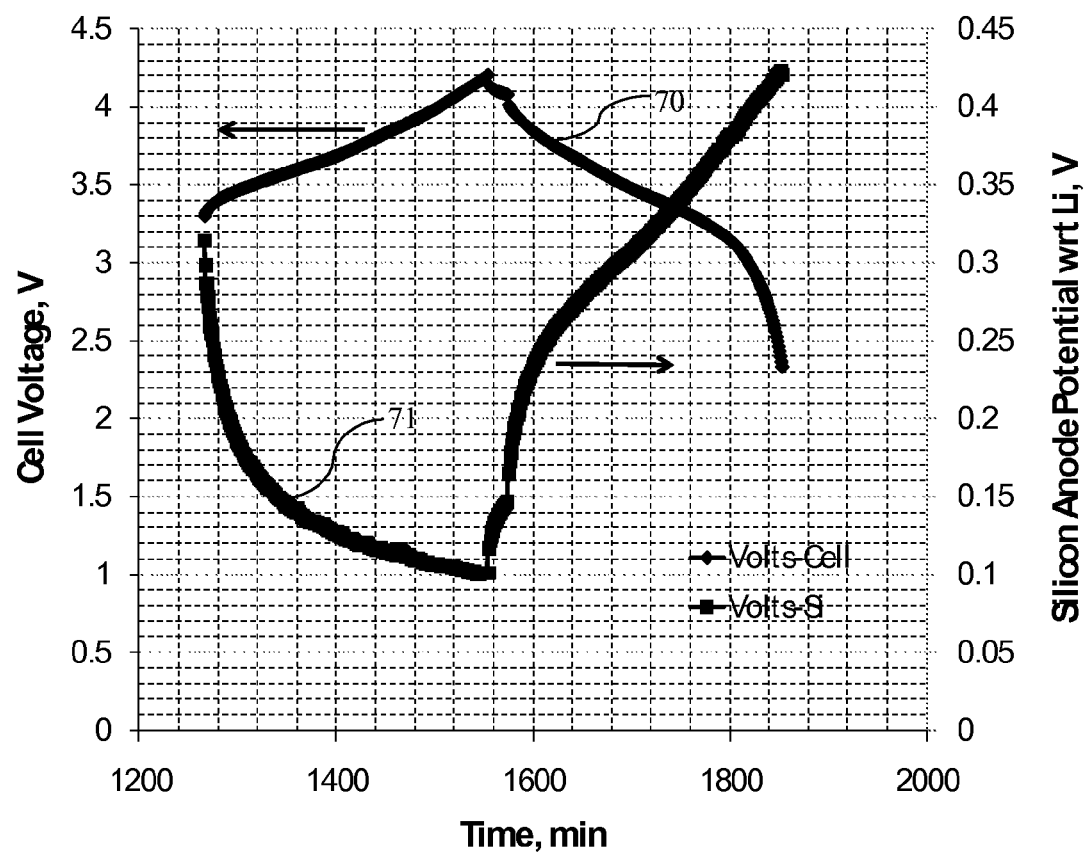
FIG. 7 is a plot of the cell voltage and the anode potential relative to a lithium auxiliary electrode versus time from an example of the present invention.

Three-Dimensional Battery Cell with Lithium Foil Auxiliary Electrode as a Reference Electrode A three-dimensional battery was constructed from a 1 cm by 1 cm silicon wafer containing two sets of walls, 120 microns tall, separated by a spacing of 100 microns. One set of walls served as a cathode and were coated with a paste comprising lithium nickel cobalt aluminum oxide, Carbon Black, and polyvinylidene difluoride. The other set of walls served as the anode. The anode and cathode walls were separated by a porous separator. A third electrode comprising a lithium metal foil was positioned above the walls and separated from the walls by a polyolefin separator (Celgard 2325). By placing the lithium foil on top of the three-dimensional structure, the lithium foil was electrolytically coupled with all the anode and cathode walls. The entire assembly was placed in a metalized plastic pouch, electrolyte added, and the pouch sealed. The cathode was cycled with respect to the lithium foil. FIG. 5 shows the potential 50 of the cathode relative to the auxiliary electrode. Then the anode was first cycled with respect to the lithium foil. FIG. 6 shows the potential 60 of the anode relative to the auxiliary electrode. Finally, the anode was cycled with respect to the cathode while monitoring the cell voltage and the voltage of the anode with respect to the lithium foil auxiliary electrode. FIG. 7 shows a chart of one full charge/rest/discharge cycle with plots of both the cell voltage 70 and anode voltage 71 relative to the auxiliary electrode.

Although the invention has been described with reference to the presently preferred embodiments, it should be understood that various modifications could be made without departing from the scope of the invention.

What is claimed is:

1. A three-dimensional secondary battery cell comprising:
an electrolyte;
a cathode, having a surface in contact with the electrolyte;
an anode, having a surface in contact with the electrolyte and wherein the anode is electrolytically coupled to the cathode; and
an auxiliary electrode, having a surface in contact with the electrolyte, wherein the auxiliary electrode is electrically coupled and electrolytically coupled the cathode and/or to the anode, and the average distance between the surface of the auxiliary electrode and the surface of the coupled cathode or the coupled anode is between about 1 micron and about 10,000 microns, the average distance between the surface of the auxiliary electrode and the surface of the coupled cathode or the coupled anode being the average of the shortest path for ion transfer from every point on the coupled cathode or anode to the auxiliary electrode.

2. The secondary battery cell of claim 1, wherein the average distance between the surface of the auxiliary electrode and the surface of the coupled cathode or the coupled anode is between about 5 microns and about 1000 microns.

3. The secondary battery cell of claim 1, wherein the average distance between the surface of the auxiliary electrode and the surface of the coupled cathode or the coupled anode is between about 10 microns and about 500 microns.

4. The secondary battery cell of claim 1, wherein the auxiliary electrode is electrically coupled and electrolytically coupled to the cathode.

5. The secondary battery cell of claim 4, wherein the auxiliary electrode functions as an auxiliary cathode.

6. The secondary battery cell of claim 1, wherein the cathode comprise a cathode material, wherein the cathode material is atmospherically unstable in its carrier-ion-inserted form.

7. The secondary battery cell of claim 6, wherein the cathode material comprises titanium sulfide, molybdenum sulfide or vanadium oxide.

8. The secondary battery cell of claim 1, wherein the auxiliary electrode is electrically coupled and electrolytically coupled to the anode.

9. The secondary battery cell of claim 8 wherein the auxiliary electrode functions as an auxiliary anode.

10. The secondary battery cell of claim 1, wherein the anode comprise an anode material, wherein the anode material is atmospherically unstable in its carrier-ion-inserted form.

11. The secondary battery cell of claim 10, wherein the anode material comprises silicon, germanium, carbon, tin, aluminum, mixtures of transition metals and silicon, or lithium titanate.

12. The secondary battery cell of claim 1, wherein the anode comprise an anode material, wherein the anode material is atmospherically unstable in its carrier-ion-inserted form and wherein the cathode comprise a cathode material, wherein the cathode material is atmospherically unstable in its carrier-ion-inserted form.

13. The secondary battery cell of claim 1, wherein the auxiliary electrode comprises a plurality of electrode elements.

14. The secondary battery cell of claim 1, wherein the electrolyte is a nonaqueous electrolyte.

15. A secondary battery comprising the secondary battery cell of claim 1.

16. The secondary battery cell of claim 1, wherein the cell has been cycled and the cathode or the anode has been replenished by the auxiliary electrode.

17. A system comprising the secondary battery cell of claim 1, and further comprising: a sensor for sensing the voltage of the cathode and/or the anode relative to the auxiliary electrode, wherein the sensor is electrically coupled to the cathode and/or the anode at which the voltage is sensed and to the auxiliary electrode; and a controller electrically coupled to the sensor, wherein the controller controls the voltage or the current in a load or charge circuit between the cathode and anode according to the sensed voltage.

18. The system of claim 17, further comprising a memory unit coupled to the sensor, wherein the memory unit stores data about the sensed voltage.

19. The system of claim 18, wherein the memory unit is coupled to the controller and the controller controls the voltage or the current in the load/charge circuit according to the data stored in the memory unit.

20. The system of claim 18, wherein the controller causes the auxiliary electrode to replenish at least one of the cathode or anode according to the data stored in the memory unit.

21. The system of claim 17, wherein the controller causes the auxiliary electrode to replenish at least one of the cathode or anode according to the sensed voltage.

22. A secondary battery comprising the system of claim 17.

23. A secondary battery comprising a plurality of the secondary battery cells of claim 1, wherein the cathodes of the plurality of cells are electrically coupled, the anodes of the plurality of cells are electrically coupled, and the auxiliary electrodes of the plurality of cells are electrically coupled.

24. A method of preparing a replenished secondary battery cell comprising: obtaining the secondary battery cell of claim 1; cycling the anode and cathode of the cell; and replenishing the coupled cathode or the coupled anode with carrier ions from the auxiliary electrode.

25. The method of claim 24, further comprising removing the auxiliary electrode from the secondary battery cell.

26. The replenished secondary battery cell prepared by the method of claim 25.

27. The replenished secondary battery cell prepared by the method of claim 24.

* * * * *